(12) United States Patent
Teibel

(10) Patent No.: US 7,260,362 B2
(45) Date of Patent: Aug. 21, 2007

(54) METHOD AND APPARATUS FOR ESTABLISHING AD HOC GROUPS IN A WIRELESS COMMUNICATION NETWORK

(75) Inventor: Daniel A. Teibel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 644 days.

(21) Appl. No.: 09/961,541

(22) Filed: Sep. 24, 2001

(65) Prior Publication Data

US 2003/0060168 A1    Mar. 27, 2003

(51) Int. Cl.
*H04B 1/00* (2006.01)
(52) U.S. Cl. ............... 455/69; 455/115.3; 455/518; 455/519; 455/522
(58) Field of Classification Search ...... 455/41.1–41.3, 455/69–70, 115.3, 440, 458, 518–519, 522; 370/254, 338
See application file for complete search history.

(56) References Cited

U.S. PATENT DOCUMENTS

| 5,465,399 | A  | * | 11/1995 | Oberholtzer et al. .......... 455/69 |
| 6,405,027 | B1 | * | 6/2002  | Bell ........................... 455/403 |
| 6,456,599 | B1 | * | 9/2002  | Elliott ........................ 370/254 |
| 6,496,550 | B1 | * | 12/2002 | Bruccoleri et al. ......... 375/345 |
| 6,542,748 | B2 | * | 4/2003  | Hendrey et al. .......... 455/456.1 |
| 6,735,448 | B1 | * | 5/2004  | Krishnamurthy et al. ... 455/522 |
| 6,781,963 | B2 | * | 8/2004  | Crockett et al. ............ 370/260 |
| 2001/0007815 | A1 | * | 7/2001 | Philipsson .................. 455/41 |
| 2002/0156861 | A1 | * | 10/2002 | Pierce ........................ 709/217 |

* cited by examiner

*Primary Examiner*—Melur Ramakrishnaiah
(74) *Attorney, Agent, or Firm*—Schwegman, Lundberg, Woessner & Kluth P.A.

(57) ABSTRACT

During formation of an ad hoc group, the transmit power level of a user device within a wireless communication network is reduced. Potential group members are thus identified within an immediate vicinity of the user device.

13 Claims, 3 Drawing Sheets

METHOD AND APPARATUS FOR ESTABLISHING AD HOC GROUPS IN A WIRELESS COMMUNICATION NETWORK

FIELD OF THE INVENTION

The invention relates generally to wireless communications and, more particularly, to techniques for establishing ad hoc groups within a wireless network.

BACKGROUND OF THE INVENTION

Bluetooth and other wireless network technologies enable users to create small network groups, known as ad hoc groups, that allow users to exchange data/contact information during, for example, meetings and informal encounters. A user device having wireless network capabilities will typically maintain a list of all other active network devices that are within range of the device. To establish an ad hoc group, a user must typically go through the list of active devices to select the individual devices that he wishes to include in the group. Unfortunately, such lists are often very long, sometimes including one hundred or more devices. In addition, these lists often identify individual devices using identifiers (e.g., medium access control (MAC) address, machine name, etc.) that do not necessarily identify the corresponding users of the devices. Therefore, the process of forming an ad hoc group can be difficult and time consuming.

DETAILED DESCRIPTION

Figure 1:
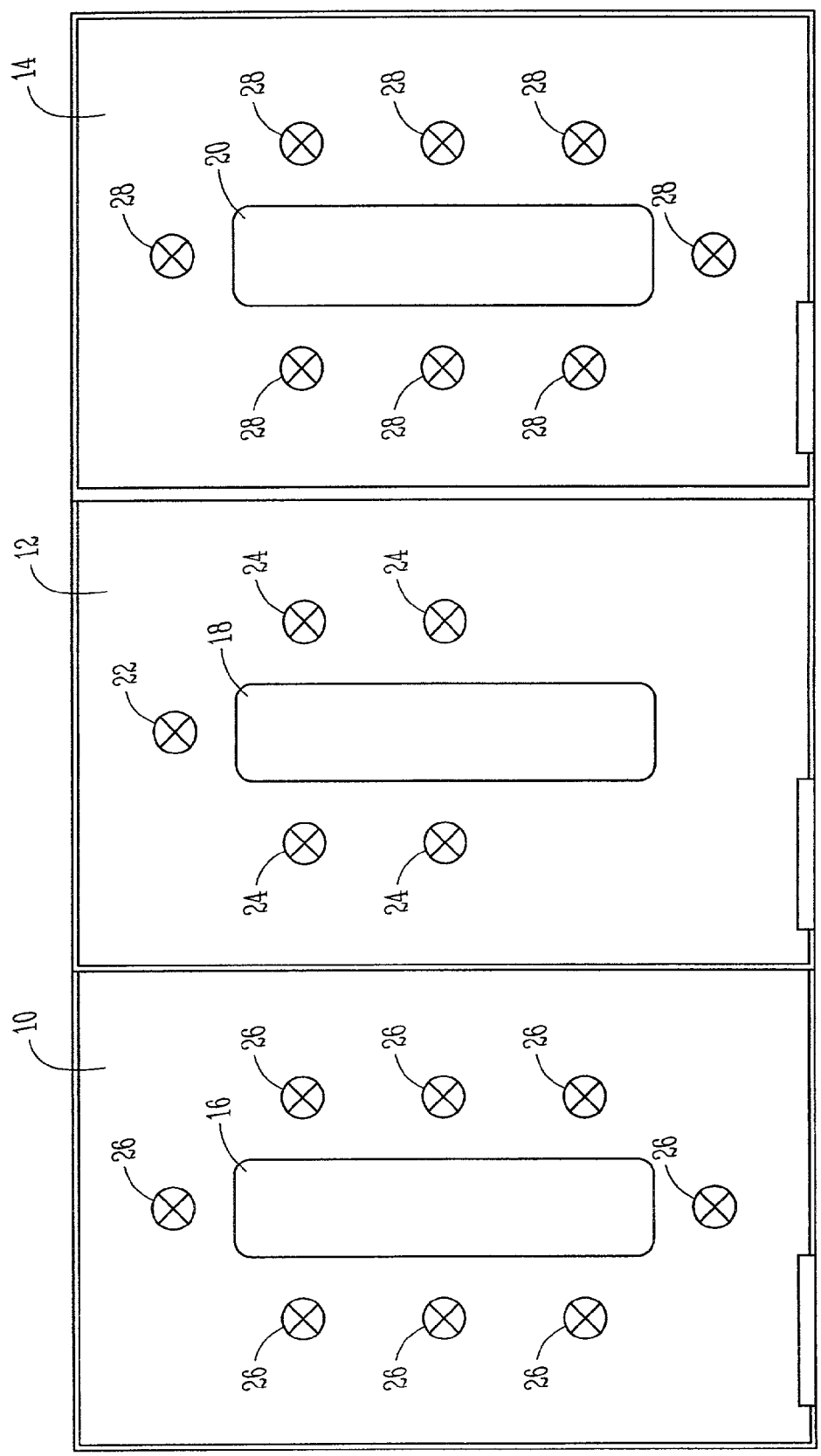
FIG. 1 is a simplified plan view illustrating a number of adjacent conference rooms within a business facility.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The present invention relates to methods and structures for use in forming ad hoc groups in a relatively simple manner. During ad hoc group formation operations, the transmit power (and corresponding range) of a wireless user device is reduced so that only devices within an immediate vicinity of a user are identified. Group members are then selected from a list of devices within the immediate vicinity. Once the group has been formed, communications within the group may be carried out at normal operating power. The inventive principles may be implemented in wireless networks following any of a number of different standards including, for example, Bluetooth, IEEE 802.11, high performance radio local area network (HIPERLAN), HomeRF™, wireless asynchronous transfer mode (WATM), and others.

FIG. 1 is a simplified plan view illustrating a number of adjacent conference rooms 10, 12, 14 within a business facility. Each of the conference rooms 10, 12, 14 has a corresponding conference table 16, 18, 20 about which employees and others can assemble during meetings. Some or all of the attendees of a meeting will often have a user device with them (e.g., a laptop or palmtop computer, a personal digital assistant (PDA), a handheld communicator, etc.) that includes wireless networking functionality. During the meeting, it may be desirable for the attendees to exchange digital information (e.g., text files, reports, graphs, schedules, contact information, etc.) between these user devices. One way to implement the information transfers is to establish an ad hoc network group that includes the interested parties. Once the ad hoc group has been formed, information transfer between the group members is relatively straight forward.

With reference to FIG. 1, suppose a user 22 within conference room 12 desires to establish an ad hoc group with other users 24 within the same conference room. In a conventional approach, the user 22 will first consult a list of network devices that is maintained within his user device. The list will typically identify each network device that is presently active within the normal operating range of the user's device. Because radio frequency signals can penetrate walls, ceilings, and floors, the list will often be quite long. For example, the list maintained on the user device of user 22 will most likely include the devices of the users 26 within conference room 10 and the devices of the users 28 within conference room 14. The list may also include other users on the same floor of the building, users on other floors of the building, and even users outside the building. In addition, the list will not typically identify the users by name. Instead, the list will often include an identifier for each device (such as a MAC address or machine name) that is not readily associated with the corresponding user. Thus, user 22 will often have to go blindly through a long list of devices to attempt to isolate the devices of the users 24 that he desires to include in the ad hoc group. In conceiving the present invention, it was determined that transmit power control techniques could be utilized to simplify the formation of ad hoc groups in a wireless network. That is, during ad hoc group formation operations, a reduced transmit power can be used so that only devices within an immediate vicinity of a user are identified as potential members of a group. The process of selecting members for the group is then greatly simplified.

Figure 2:
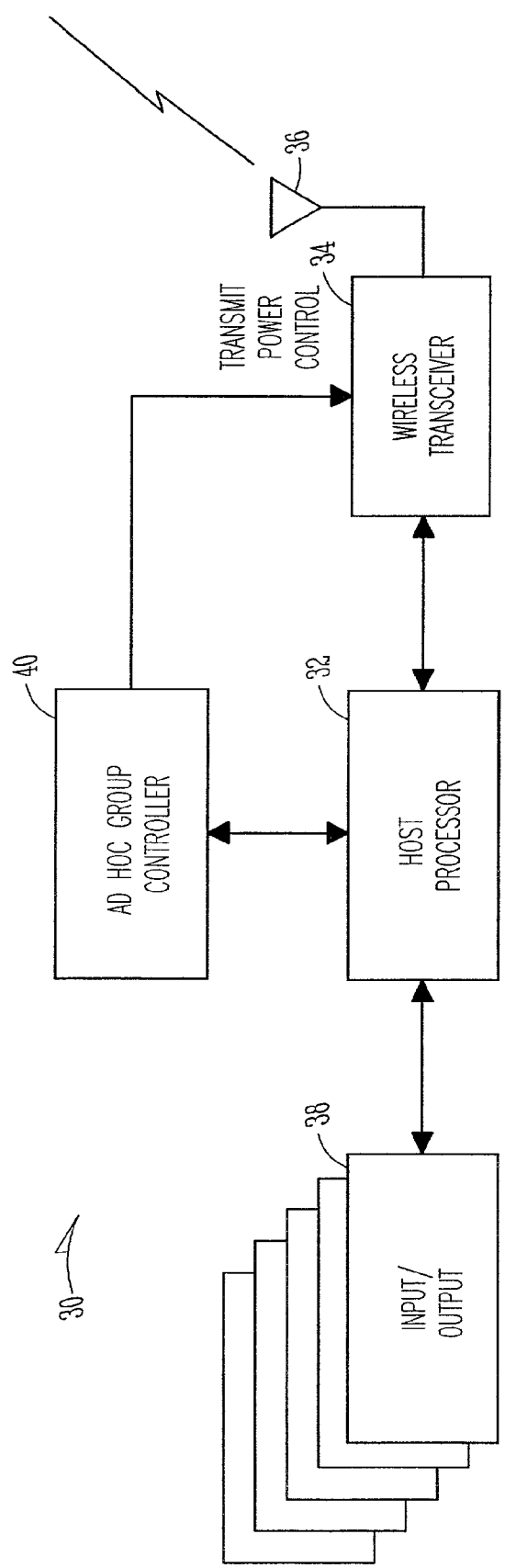
FIG. 2 is a block diagram illustrating functionality within a user device in accordance with an embodiment of the present invention.

FIG. 2 is a block diagram illustrating a user device 30 in accordance with an embodiment of the present invention. As illustrated, the user device 30 includes: a host processor 32, a wireless transceiver 34, an antenna 36, input/output devices 38, and an ad hoc group controller 40. The host processor 32 is the main digital processor of the user device 30. The host processor 32 can include any of a wide variety of digital processing devices including, for example, a general purpose microprocessor, a digital signal processor (DSP), a reduced instruction set computer (RISC), a complex instruction set computer (CISC), an application specific integrated circuit (ASIC), a field programmable gate array (FPGA), and/or others. The input/output devices 38 are devices that allow a user to input information to the user device 30 and receive information from the user device 30. The input/output devices 38 can include, for example, a keyboard, control buttons, a display, a touch screen, a mouse, a microphone, a speaker, and/or others.

The wireless transceiver 34 is operative for transmitting radio frequency (RF) signals to and receiving RF signals from free space via antenna 36. During a transmit operation, for example, the wireless transceiver 34 will receive transmit data from the host processor 32 to be transmitted to a remote device. The wireless transceiver 34 generates an RF transmit signal using the transmit data. The RF transmit signal is then delivered to the antenna 36 which launches the signal into the surrounding environment. The power level of the RF transmit signal will dictate the range of the transmitted signal. During a receive operation, the antenna 36 receives an RF signal from free space and transfers the signal to the wireless transceiver 34. The transceiver 34 then processes the received signal to generate a baseband representation of the signal. The baseband information is then delivered to the host processor 32 which may then further process the information. The wireless transceiver 34 may operate in accordance with any of a number of different wireless standards including, for example, Bluetooth, IEEE 802.11, HIPERLAN, HomeRF™, WATM, and/or others.

In one approach, the wireless transceiver 34 is an integral part of the hardware of the user device 30. In another approach, the wireless transceiver 34 is implemented on a card or board that is inserted into an available slot of the user device 30, either before or after purchase by the end-user. In yet another approach, significant portions of the wireless transceiver functionality are implemented in software within the host processor 32 itself. As will be appreciated, many alternative configurations are possible. Although illustrated as part of a single unit, it should be appreciated that the transmit and receive functionality of the wireless transceiver 34 may be implemented separately. Separate transmit and receive antennas may also be used.

The ad hoc group controller 40 is operative for facilitating the formation and maintenance of ad hoc groups for a user associated with the user device 30 (i.e., the local user). In one embodiment of the invention, the ad hoc group controller 40 is implemented within a hardware component that is separate from the host processor 32. In another embodiment, the ad hoc group controller 40 is implemented within the host processor 32 as, for example, a software application, module, or routine. The ad hoc group controller 40 may also be implemented as part of the wireless transceiver 34 (e.g., as a separate function within a transceiver module). Hybrid implementations are also possible. As illustrated, the ad hoc group controller 40 communicates with the wireless transceiver 34 during group-related operations to control a transmit power of the unit.

When the local user wishes to establish an ad hoc group, the user indicates such to the host processor 32 using an input device. In one approach, for example, the local user will double click on an appropriate icon on a graphical user interface (GUI) of the user device 30 when an ad hoc group is desired. Many alternative approaches also exist. In response to the request from the local user, the host processor 32 activates the ad hoc group controller 40. The ad hoc group controller 40 then instructs the host processor 32 to transmit an ad hoc group invitation signal from antenna 36. Before the invitation signal is transmitted, however, the ad hoc group controller 40 instructs the wireless transceiver 34 to reduce the transmit power from the normal power level associated with the wireless protocol being implemented to a reduced level. Because the transmit power level of the invitation signal has been reduced, the range of the user device 30 during this time will be limited to an immediate area surrounding the user device 30. Thus, the invitation signal will only be received by devices within this immediate area.

When an external user device receives the invitation signal, the external device may transmit a response signal back to the user device 30. The response signal may include, for example, the identity of the corresponding device (e.g., the MAC address, machine name, etc.) and/or the identity of the associated user. The user device 30 receives the response signals of the external devices and uses the signals to generate a list of potential group members. The ad hoc group controller 40 then presents the list to the local user through one of the input/output devices 38 (e.g., a display device). The local user can then select individual devices/users from the list for inclusion in the ad hoc group using an input device (e.g., a mouse, a stylus, a keyboard, a microphone if speech recognition is being used, etc.). Once the members of the ad hoc group have been selected by the local user, the ad hoc group controller 40 may instruct the wireless transceiver 34 to return to a normal transmit power level to support communication among the group members. An intermediate security procedure may also be undertaken to ensure the security of group communications. For example, in one approach, the local user may manually distribute a session key to the other members in the group for use during group operations. Many alternative security measures are also possible.

As used herein, the term "normal transmit power level" refers to the transmit power level ordinarily used by a corresponding wireless standard or protocol. The normal transmit power level can include the effects of power level adjustments made as part of a power control scheme to, for example, conserve energy, reduce interference, improve the quality of a connection, etc. within a system. Thus, the normal transmit power level is not necessarily the full (maximum) power level permitted by a particular protocol.

In one embodiment of the invention, the user device 30 will continue to regularly transmit reduced power invitation signals (e.g., in a beacon mode) even after normal power group communications have been initiated. This technique can be used to facilitate, for example, the addition of new members to the group who were not present at the time of initial group formation. Referring back to FIG. 1, for example, if a new user were to enter conference room 12 halfway through the meeting, the new user's communication device could sense the invitation beacon and respond to it immediately. The user 22 could then be prompted for permission to allow the new user into the group. In one approach, reduced power invitation signals are transmitted every 5 seconds by a user device. Thus, a new person entering a meeting can become part of a corresponding group within a short period of time with minimal human interaction.

Figure 3:
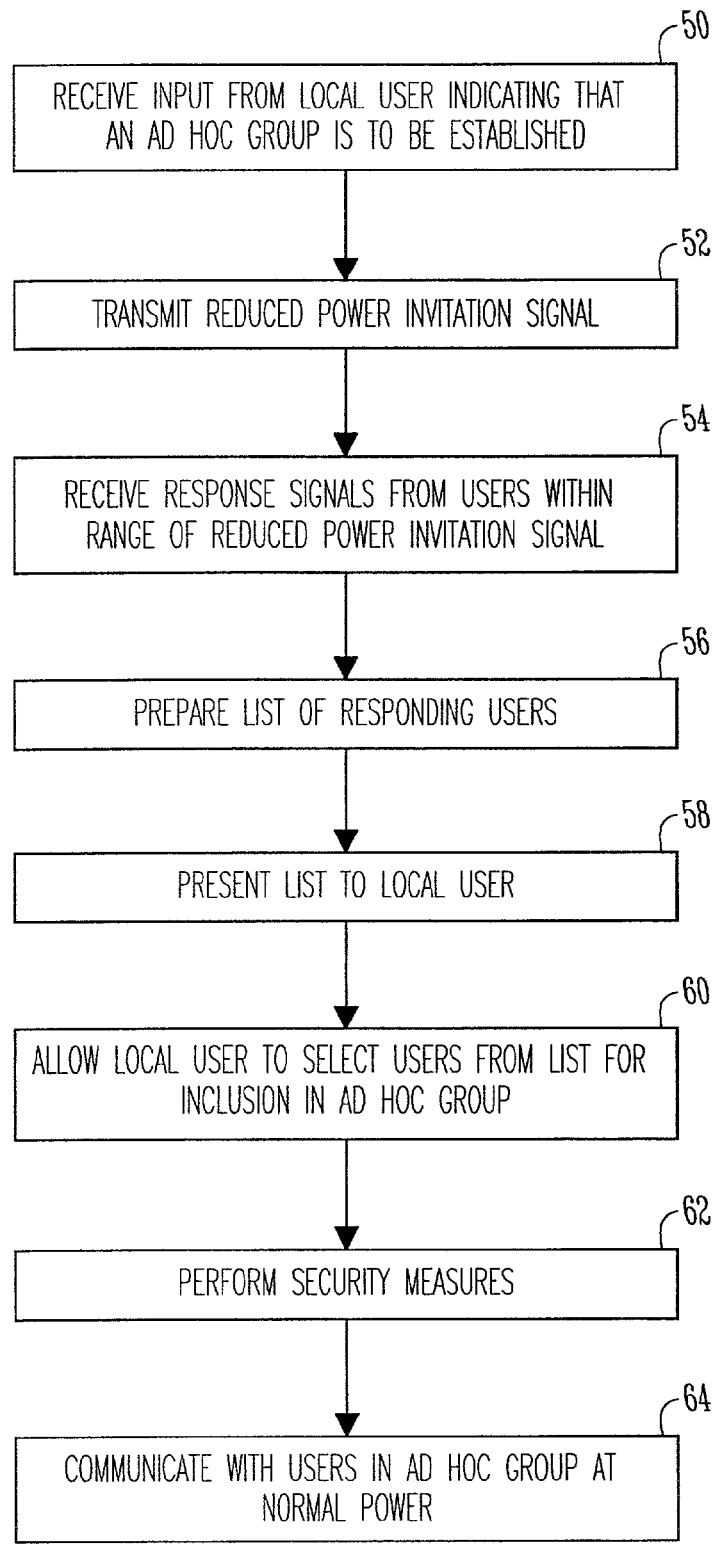
FIG. 3 is a flowchart illustrating a method for establishing an ad hoc group in accordance with an embodiment of the present invention.

FIG. 3 is a flowchart illustrating a method for establishing an ad hoc group in accordance with an embodiment of the present invention. A local user first provides input indicating that an ad hoc group is to be established (block 50). In response, an invitation signal is transmitted at a reduced transmit power level (block 52). The invitation signal can include, for example, a unique identifier identifying the corresponding user device and an invitation to join the ad hoc group. Response signals are then received from users that are within range of the reduced power invitation signal (block 54). A list is next compiled of the users that responded to the invitation signal (block 56). The list is then presented to the local user using an output device, such as an LCD display (block 58). The local user is then allowed to select users from the list for inclusion in the ad hoc group (block 60). After group members have been selected, security measures may be undertaken to provide security during subsequent group communications (block 62). Once the group has been established and security concerns have been addressed, the group members are allowed to communicate with one another using normal transmit power levels (block 64).

In at least one embodiment of the invention, a single predefined low transmit power level is used during ad hoc group formation operations. In other embodiments, a variable low power level is used that will depend upon an approximate physical size of the group meeting area (e.g., the size of the room within which the meeting will be held). In one approach, for example, the local user indicates the approximate physical size of the meeting space as part of the original ad hoc group request. In another approach, the local user is prompted for physical size information after the original request has been made. The local user may be presented with a menu, for example, that includes a number of possible size ranges for the group meeting space. Each of the size ranges has a corresponding low power level associated with it. The local user selects a size range from the menu and the user device then transmits an invitation signal at the corresponding power level. In another technique, the local user can input a range value (e.g., a minimum distance that will encompass all desired group members) to the user device and the user device can then calculate or look up a reduced power level that will encompass the entire group. In yet another technique, the local user is prompted to select a reduced power level from a list of available levels (e.g., low, medium, high) based on the local user's knowledge of the physical size of the meeting area (e.g., for a small conference room, the low level is selected, etc.). As will be appreciated, any number of alternative methods can be used for determining a reduced power level for use during group formation activities that is tailored to the approximate physical size of the actual meeting space. By so tailoring the transmit power level, a more precise initial list of potential group members can be generated, thus further simplifying the ad hoc group formation process.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method for establishing an ad hoc group comprising:
   transmitting by a transceiver a wireless invitation signal to a plurality of potential user devices at transmit power level reduced from normal transmit power level, the reduced transmit power level corresponding to a range from the transceiver to the plurality of potential user devices;
   receiving response signals from user devices that have received the wireless invitation signal;
   preparing a list of the user devices based on the received response signals;
   selecting user devices from the list;
   communicating by the transceiver with the selected user devices at normal transmit power level; and
   regularly transmitting by the transceiver beacon signals at reduced transmit power during communication with the selected user devices at normal transmit power to invite other potential user devices within the range of the transceiver to communicate with the transceiver.

2. The method of claim 1, wherein transmitting the wireless invitation signal includes:
   selecting the reduced transmit power level from a plurality of predetermined transmit power levels.

3. The method of claim 1, wherein transmitting the wireless invitation signal includes:
   selecting the reduced transmit power level from a plurality of predetermined transmit power levels based on an approximate physical size of a meeting area.

4. The method of claim 1, wherein transmitting the wireless invitation signal includes:
   determining an approximate physical size of a meeting area; and
   calculating the reduced transmit power level based on the determined approximate physical size.

5. The method of claim 1, wherein the list of user devices includes user names associated with the user devices.

6. A wireless communication device comprising:
   a wireless transceiver; and
   an ad hoc group controller operatively coupled to said wireless transceiver to control said wireless transceiver to transmit: i) an invitation signal at transmit power level reduced from normal transmit power level, the reduced transmit power level corresponding to a range from the transceiver to a plurality of potential user devices during ad hoc group formation; ii) normal communication at normal transmit power level during communication with user devices of the plurality of potential user devices that are members of the ad hoc group; and iii) regular beacon signals at reduced transmit power during normal communication with user devices that are members of the ad hoc group at normal transmit power to invite other potential user devices within the range of the wireless transceiver to communicate with the wireless transceiver.

7. The wireless communication device of claim 6, wherein the ad hoc group formation includes transmission of an ad hoc group invitation signal at the reduced transmit power level.

8. The wireless communication device of claim 6, wherein the communication with user devices that are members of the ad hoc group includes data transfer.

9. The wireless communication device of claim 6, wherein the ad hoc group controller includes:
   a list compilation function for compiling a list of user devices of the plurality of potential user devices based on responses received from the user devices to an invitation signal transmitted by the wireless transceiver at the reduced transmit power.

10. The wireless communication device of claim 9, wherein the ad hoc group controller presents the list of the user devices to a local user via an output device.

11. The wireless communication device of claim 6, wherein the ad hoc group controller includes:
   a user query unit to query a local user regarding an approximate size of a meeting area associated with the ad hoc group.

12. The wireless communication device of claim 6, wherein the ad hoc group controller includes:

a power level determination unit to determine the reduced transmit power level for an invitation signal based on an approximate size of a meeting area associated with the ad hoc group.

13. The wireless communication device of claim 6, wherein said wireless transceiver is Bluetooth compatible.

* * * * *